(12) United States Patent
Moyers

(10) Patent No.: US 10,107,484 B2
(45) Date of Patent: Oct. 23, 2018

(54) LAWN MOWER LIGHT

(71) Applicant: Jennifer Moyers, Nashville, TN (US)

(72) Inventor: Jennifer Moyers, Nashville, TN (US)

(*) Notice: Subject to any disclaimer, the term of this patent is extended or adjusted under 35 U.S.C. 154(b) by 275 days.

(21) Appl. No.: 14/887,709

(22) Filed: Oct. 20, 2015

(65) Prior Publication Data

US 2016/0116145 A1 Apr. 28, 2016

Related U.S. Application Data

(60) Provisional application No. 62/068,093, filed on Oct. 24, 2014.

(51) Int. Cl.
| | |
|---|---|
| *F21V 21/00* | (2006.01) |
| *F21V 21/096* | (2006.01) |
| *A01D 34/00* | (2006.01) |
| *F21V 14/02* | (2006.01) |
| *F21V 33/00* | (2006.01) |
| *F21V 21/30* | (2006.01) |

(52) U.S. Cl.
CPC .......... *F21V 21/096* (2013.01); *A01D 34/001* (2013.01); *F21V 14/02* (2013.01); *F21V 14/025* (2013.01); *F21V 21/0965* (2013.01); *F21V 21/30* (2013.01); *F21V 33/00* (2013.01); *F21V 33/006* (2013.01)

(58) Field of Classification Search
CPC .... F21V 21/096; F21V 21/0965; F21V 14/02; F21V 14/025; F21V 21/30; F21V 21/145; F21V 33/0044; F21V 33/0024; F21V 33/006; F21V 33/00; A01D 34/001; B60Q 1/2615; B60Q 1/04; F21W 2131/403; F21L 4/04; F21L 15/08; F21L 14/04

USPC ......................................................... 362/486
See application file for complete search history.

(56) References Cited

U.S. PATENT DOCUMENTS

| | | | |
|---|---|---|---|
| 4,907,769 A | 3/1990 | Hunley, Jr. et al. | |
| 5,453,915 A * | 9/1995 | Bradley, III | A45D 42/16 248/474 |
| 5,563,774 A * | 10/1996 | Welsch | B60Q 1/0088 180/19.1 |
| 5,752,766 A * | 5/1998 | Bailey | F21V 19/02 362/231 |
| 6,120,164 A * | 9/2000 | Libin | F21V 21/30 362/227 |
| 6,220,728 B1 * | 4/2001 | Andrus | F21V 21/116 362/287 |

(Continued)

*Primary Examiner* — Bryon T Gyllstrom
*Assistant Examiner* — James Endo
(74) *Attorney, Agent, or Firm* — Luedeka Neely Group, P.C.

(57) ABSTRACT

A lawn mower light for providing illumination while mowing a lawn in low visibility conditions. The lawn mower light is configured to be removably mounted to a lawn mower deck and includes a base having a fastener, such as a magnet on an underside thereof configured to removably affix the lawn mower light to a lawn mower deck. The base also includes a centrally located shaft having a head portion pivotally affixed thereon. The head portion includes a lighting assembly configured to provide illumination. The lighting assembly includes a power source, an activation switch, and a plurality of light sources. One of the plurality of light sources is disposed on a center point on the head portion, wherein the remaining plurality of light sources are disposed radially therearound.

1 Claim, 2 Drawing Sheets

(56) References Cited

U.S. PATENT DOCUMENTS

| | | | |
|---|---|---|---|
| 6,273,585 B1* | 8/2001 | Wu | F21V 21/30 |
| | | | 362/135 |
| 6,457,841 B1* | 10/2002 | Lynch | F21L 4/045 |
| | | | 362/197 |
| 6,641,283 B1 | 11/2003 | Bohler | |
| 8,142,045 B2* | 3/2012 | Peak | B60Q 7/00 |
| | | | 362/183 |
| 8,545,066 B2 | 10/2013 | Coleman et al. | |
| 2003/0086268 A1* | 5/2003 | Kovacik | F21L 14/026 |
| | | | 362/287 |
| 2003/0141420 A1* | 7/2003 | Knight | F16M 11/10 |
| | | | 248/128 |
| 2009/0027900 A1* | 1/2009 | Janos | F21V 21/0824 |
| | | | 362/373 |
| 2009/0046465 A1* | 2/2009 | Hashimoto | F21K 9/00 |
| | | | 362/294 |
| 2009/0097252 A1* | 4/2009 | Liou | F21S 6/003 |
| | | | 362/269 |
| 2009/0116247 A1* | 5/2009 | Kauffman | F21V 15/01 |
| | | | 362/346 |
| 2011/0255274 A1* | 10/2011 | Coleman | F21L 4/02 |
| | | | 362/183 |
| 2011/0292643 A1* | 12/2011 | Chen | F21L 4/08 |
| | | | 362/183 |
| 2012/0287613 A1* | 11/2012 | Hamel | F21V 29/004 |
| | | | 362/184 |
| 2013/0135866 A1* | 5/2013 | Souvay | F21K 9/00 |
| | | | 362/249.02 |
| 2013/0201683 A1* | 8/2013 | Kirchberger | F21S 6/003 |
| | | | 362/235 |
| 2013/0265755 A1* | 10/2013 | Adams | F21V 5/04 |
| | | | 362/235 |

\* cited by examiner

LAWN MOWER LIGHT

CROSS REFERENCE TO RELATED APPLICATION

This application claims the benefit of U.S. Provisional Application No. 62/068,093 filed on Oct. 24, 2014. The above identified patent application is herein incorporated by reference in its entirety to provide continuity of disclosure.

FIELD OF THE INVENTION

The present invention relates to lawn mowing accessories. More specifically, the present invention provides a lawn mower attachment that allows a user to illuminate the lawn while mowing the lawn in low visibility conditions. The lawn mower light includes a base removably mounted to a lawn mower deck and a head portion having a lighting assembly configured to provide illumination.

BACKGROUND OF THE INVENTION

It is important to routinely mow the lawn of a home or business in order to provide a neat and professional appearance to the home or business. A properly cut lawn keeps the grass short, neat and even, which can be very pleasant and pleasing to people. In addition, mowing the lawn also helps with keeping the lawn healthy by eliminating some of the pests that live in the grass. However, especially during the summer, the weather can be very hot and humid, which can make mowing the lawn a very taxing chore. Therefore, there exists a variety of safety precautions to prevent a person from suffering a heat stroke or other symptoms from heat.

One of the most effective safety measures is to mow the lawn in the evening to avoid the extreme heat during the daytime. In this way, the person mowing the lawn will not sweat as profusely as during the daytime and minimalize the chances of dehydration. In addition, hiding from the sun is also a great benefit with mowing the lawn later in the day. The person mowing the lawn can also avoid sunburn, skin damage and other possible conditions. However, mowing the lawn later in the day also has a disadvantage because it can be difficult to see the grass to determine if the user has already mowed a specific part of the lawn, or if there are any obstructions on the lawn, such as toys, rocks, and other items. Therefore, there exists a need for a device that allows a user to illuminate the lawn while mowing in low visibility conditions.

Devices have been disclosed in the prior art that relate to lawn mower lights. These include devices that have been patented and published in patent application publications. Some of these devices provide a general light source having magnetic bases, however, these devices relate to flashlight supports or lamp bases that do not direct light forward from a housing. The present invention, instead, provides a head portion that illuminates forwardly, and also includes a base having a fastener for removably attaching the device to a lawn mower deck.

More specifically, the present invention provides a lawn mower light having a base and a head portion affixed thereon. The underside of the base includes a fastener, such as a magnet configured to removably mount to a lawn mower deck. The base also includes a centrally located shaft extending upwardly therefrom having a head portion pivotally affixed thereon. The head portion includes a lighting assembly configured to allow a user to illuminate outwardly therefrom while mowing a lawn. The lighting assembly includes a power source, an activation switch, and a plurality of light sources disposed on the head portion.

It is therefore submitted that the present invention is substantially divergent in design elements from the prior art, and consequently it is clear that there is a need in the art for an improvement to lawn mower lights. In this regard, the instant invention substantially fulfills these needs.

SUMMARY OF THE INVENTION

In view of the foregoing disadvantages inherent in the known types of lawn mower lights now present in the prior art, the present invention provides a lawn mower light wherein the same can be utilized for illuminating the lawn when a user is mowing the lawn in low visibility conditions.

It is therefore an object of the invention to provide a new and improved lawn mower light that has all of the advantages of the prior art and none of the disadvantages.

Another object of the present invention is to provide a new and improved lawn mower light comprising a base having a fastener on an underside thereof that is configured to removably attach to a lawn mower deck.

Yet another object of the present invention is to provide a new and improved lawn mower light, wherein the base also includes a centrally located shaft extending upwardly and orthogonally therefrom.

Still yet another object of the present invention is to provide a new and improved lawn mower light, wherein the centrally located shaft includes a head portion having a lighting assembly configured to illuminate outwardly from the head portion.

A further object of the present invention is to provide a new and improved lawn mower light, wherein the lighting assembly includes a power source, an activation switch, and a plurality of light sources.

Another object of the present invention is to provide a new and improved lawn mower light, wherein the head portion is preferably circular and the plurality of light sources are disposed around an outer edge thereof.

Still yet another object of the present invention is to provide a new and improved lawn mower light, wherein the device may be readily fabricated from materials that permit relative economy and are commensurate with durability.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
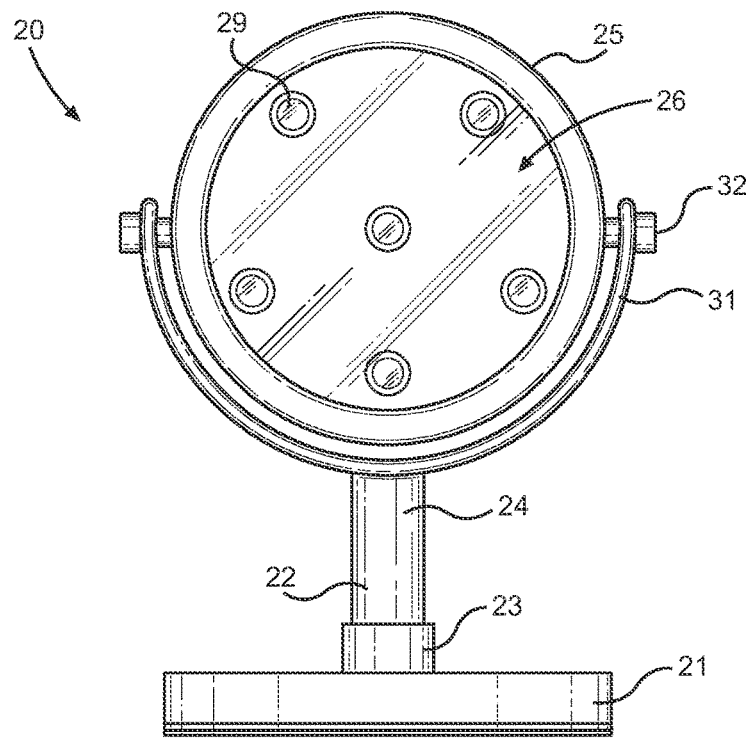
FIG. 1 shows a front perspective of the lawn mower light.

Reference is made herein to the attached drawings. Like reference numerals are used throughout the drawings to depict like or similar elements of the lawn mower light. For the purposes of presenting a brief and clear description of the present invention, the preferred embodiment will be discussed as used for illuminating a lawn while mowing in low visibility conditions. The figures are intended for representative purposes only and should not be considered to be limiting in any respect.

Figure 2:
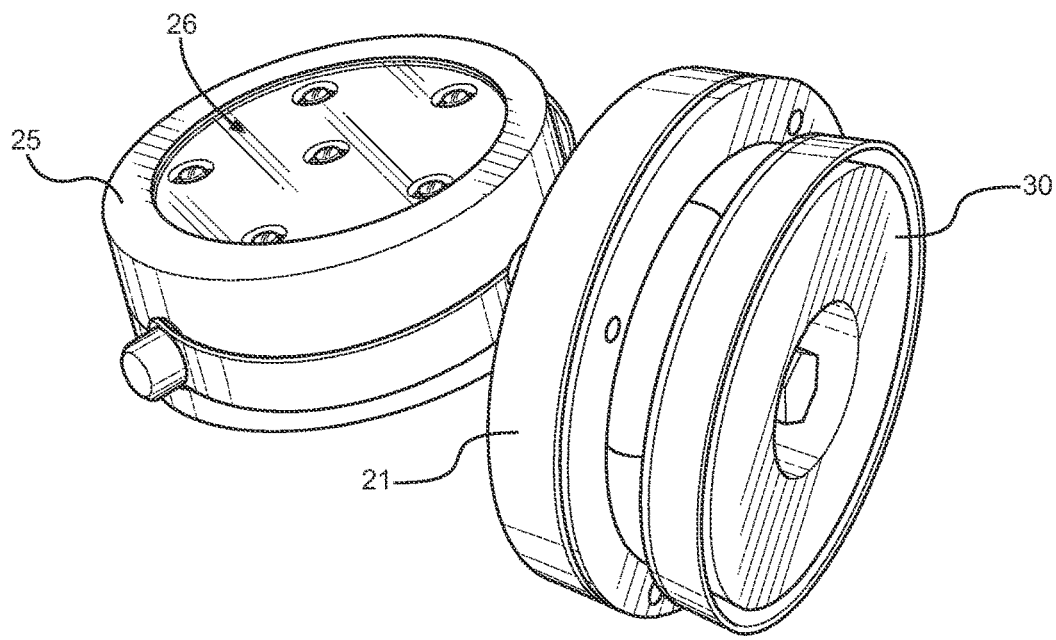
FIG. 2 shows a side perspective of the lawn mower light.

Referring now to FIGS. 1 and 2, there is shown a front perspective view and a side perspective view of the lawn mower light, respectively. The lawn mower light 20 is configured to be removably mounted on a lawn mower or other similar device in order to provide illumination to users while mowing the lawn in low visibility conditions. The mower light 20 includes a base 21 having a shaft 22 extending upwardly therefrom. Preferably, the shaft 22 is centrally located thereon and extends upwardly and perpendicularly therefrom. The base 21 helps to stabilize the lawn mower light 20 in a vertical orientation on a deck of a lawn mower. In the illustrated embodiment, the base 21 comprises a circular shape, however, in alternate embodiments the base 21 may have any of various other shapes. Therefore, these variations and alterations are deemed within the scope of the present disclosure.

The base 21 includes a fastener 30 on an underside thereof, wherein the fastener 30 is configured to allow the mower light 20 to be removably mounted to a lawn mower deck, or other similar devices, such as a front portion of a tractor. Preferably, the fastener 30 is a magnet, however other suitable fasteners are likewise contemplated, such as adhesives, among others. The fastener 30 may be disposed on a portion of the entirety of the underside of the base 21 depending upon the embodiment.

The shaft 22 includes a first end 23 and a second end 24, wherein the first end 23 is affixed to the base 21. The second end 24 includes a pair of arms 31 that extend outwardly therefrom. The arms 31 are preferably arcuate in configuration and extend from opposing sides of the second end 24 of the shaft 22. A head portion 25 is pivotally affixed to the pair of arms 31 via a hinge 32. In this way, the head portion 25 can be adjusted into various angles so as to illuminate a desired location.

In the illustrated embodiment, the head portion 25 comprises a circular shape, however, in alternate embodiments, the head portion 25 can have any of various other shapes. The head portion 25 includes a lighting assembly 26 that is configured to provide illumination to a user while mowing the lawn in low visibility conditions.

A plurality of light sources 29 are situated on an exterior face of the head portion 25 and configured to illuminate outwardly therefrom. Preferably, the light sources 29 are LEDs so as to provide high brightness with low power consumption. The plurality of light sources 29 are interspersed around the exterior face of the head portion 25. As illustrated, there is a light source 29 that is centrally located and a plurality of light sources 29 that are positioned along a circumference of the head portion 25. However, it is immediately recognized by those of ordinary skill in the art that the position of the plurality of light sources can be disposed in a variety of ways on the exterior face of the head portion 25. These variations do not alter the scope of the present invention and are thereby encompassed within the inventive embodiments of the present invention.

Figure 3:
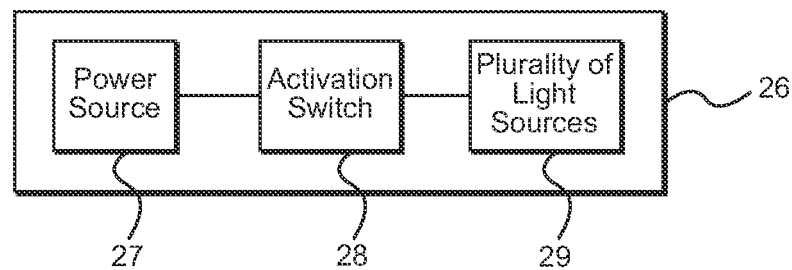
FIG. 3 shows a schematic diagram of the lawn mower light.

Referring now to FIG. 3, there is shown a schematic diagram of the lighting assembly of the mower light 20. The lighting assembly 26 comprises a power source 27, an activation switch 28, and a plurality of light sources 29 to illuminate outwardly from the head portion. The light sources 29 are preferably LEDs, however, in alternate embodiments other light sources may be used. The light sources 29 are activated via the activation switch 28, which is configured to complete a circuit from the power source 27 to the light sources 29. Preferably, the power source 27 is a battery, however, other suitable alternatives are likewise contemplated. In addition, as illustrated in FIGS. 1 and 2, the activation switch 28 is preferably a depressible button situated on the head portion, however, those of ordinary skill in the art will immediately recognize a variety of other suitable alternatives. These alterations and variations are deemed within the scope of the inventive embodiments of the present disclosure.

Figure 4:
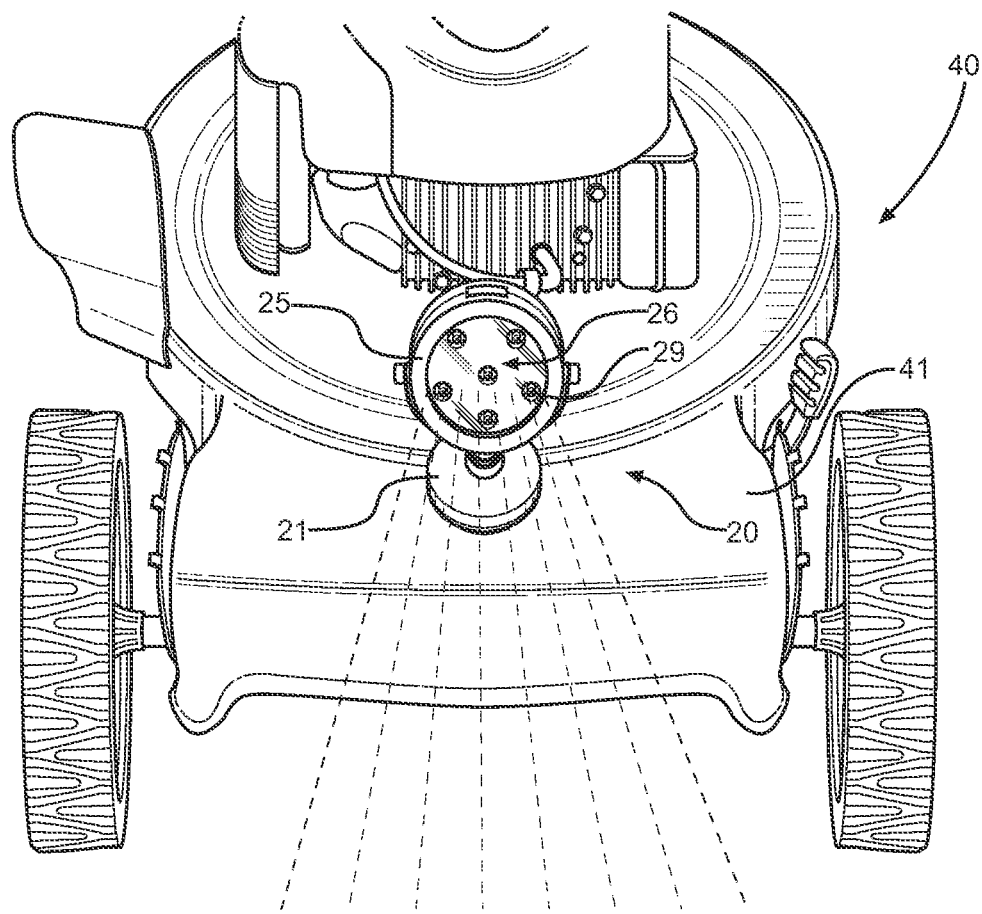
FIG. 4 shows a front perspective of the lawn mower light in use.

Referring now to FIG. 4, there is shown a front perspective of the lawn mower light in use. In operation, a user can removably secure the lawn mower light 20 onto the deck 41 of a lawnmower 40. The base 21 of the lawn mower light 20 comprises a fastener, such as a magnet, on an underside thereof, wherein the fastener can be used to secure the lawn mower light 20 to the deck 41. The lawn mower light 20 is preferably positioned so that the head portion 25 is directed forward and outward from the lawn mower 40, in the direction of travel of the lawnmower 40 during use. The head portion 25 comprises a light assembly 26 having a plurality of lights sources 29 thereon. The light sources 29 produce light in order to illuminate the area in front of the lawnmower 40 so that the user can more clearly see the area that he or she is going to mow. The head portion 25 can be adjusted to any of various angles so as to change the area being illuminated.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. An apparatus comprising:
  a lawn mower having a front end and having:
    a pair of front wheels located on the front end of the lawn mower,
    a front deck disposed between the pair of front wheels, and
    an engine disposed on the lawn mower behind the front deck;
  a lawn mower light having:
    a base having a bottom surface magnetically attached to the deck and being positioned between the front wheels and positioned in front of the engine;
    a magnet for magnetically attaching the base to the deck;

a shaft having a bottom end and a top end, the bottom end of the shaft being attached to the base and the shaft extending upwardly from the base to the top end;

first and second arcuate arms attached to the top end of the shaft and extending upwardly and outwardly from the top end of the shaft in opposite directions and terminating at first and second upper ends, respectively, the first and second upper ends being equidistant from the front deck of the lawn mower;

first and second hinges being disposed on the first and second upper ends, respectively;

a head portion having a width that is smaller than the distance between the first and second hinges, the width of the head portion being disposed between the first and second hinges, the head portion being attached to the first and second hinges and being adjustable to rotate downwardly and upwardly about the first and second hinges;

a lighting assembly disposed in the head portion in a position facing in a forward direction which is away from the engine, the lighting assembly having a center that is elevated above the front deck, the lighting assembly including a plurality of LED lights disposed in the lighting assembly for transmitting light in a forward and outward direction relative to the lawn mower, and such that the upward and downward adjustment of the head portion will upwardly and downwardly adjust the direction of light transmitted by the LED lights; the lighting system further including a battery for powering the LED lights and a switch for turning the LED lights on and off; and the base, shaft, first arm and second arm being dimensioned so as to elevate the head portion and lighting assembly above the front deck such that the center of the lighting assembly is elevated above the bottom surface of the base by a distance that is greater than the width of the head portion.

\* \* \* \* \*